M. PEITZ.
AUTOMATIC CONNECTING ROD BEARING TAKE-UP.
APPLICATION FILED MAR. 15, 1920.
1,362,176.
Patented Dec. 14, 1920.
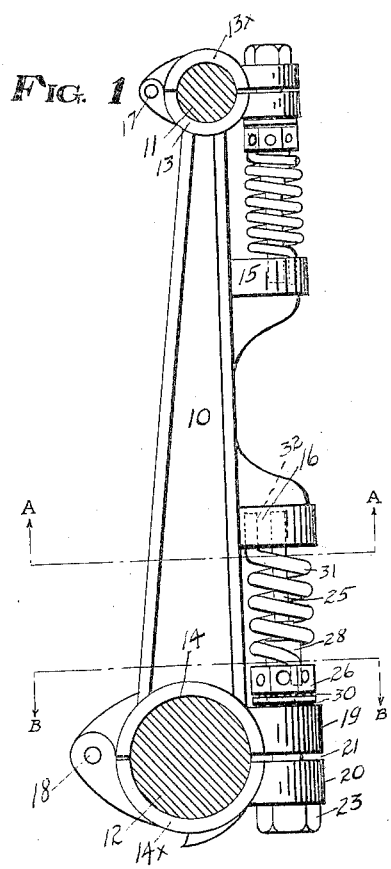
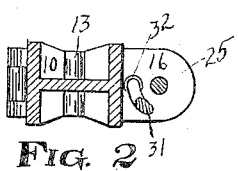
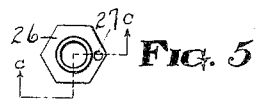
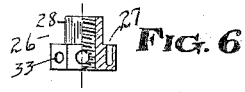
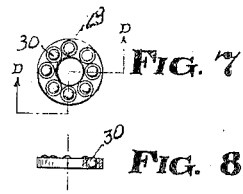
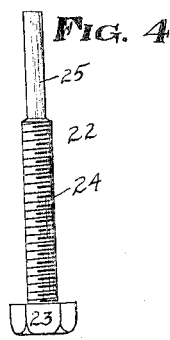
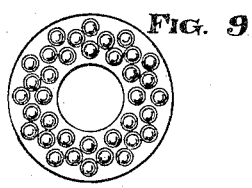
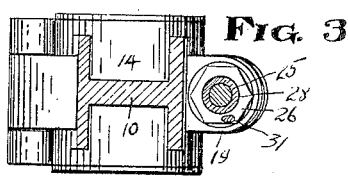
WITNESS:
W. C. Edwards Jr.
W. A. Nethercot
INVENTOR
Martin Peitz
BY
U. G. Charles
ATTORNEY

UNITED STATES PATENT OFFICE.

MARTIN PEITZ, OF COLWICH, KANSAS.

AUTOMATIC CONNECTING-ROD-BEARING TAKE-UP.

1,362,176.  Specification of Letters Patent.  Patented Dec. 14, 1920.

Application filed March 15, 1920. Serial No. 365,882.

*To all whom it may concern:*

Be it known that I, MARTIN PEITZ, a citizen of the United States, residing at Colwich, in the county of Sedgwick and State of Kansas, have invented certain new and useful Improvements in an Automatic Connecting-Rod-Bearing Take-Up, of which the following is a description, referring to the drawings which accompanying this specification.

The invention is applicable to connecting rods as generally employed in internal combustion engines having especial reference to an improved means for automatically taking up the bearings to compensate for wear occasioned by engine operation and to promote and secure an even bearing at all times for the allied members in the acting combination.

In the drawings, Figure 1 shows a side elevation of my improved connecting rod and the allied members in the assembly. Fig. 2 is a view taken along the line A—A, Fig. 1 and looking in the direction of the arrows. Fig. 3 is a view taken along the line B—B Fig. 1 and looking in the direction of the arrows. Fig. 4 shows the bolt as employed in the combination in Fig. 1. Fig. 5 illustrates a plan view of the nut employed upon the bolt in the combination in Fig. 1. Fig. 6 is a sectional side view of the nut taken along the line C—C Fig. 5 and looking in the direction of the arrows. Fig. 7 is a plan view of the non-frictional washer. Fig. 8 is a sectional side view of the washer seen in Fig. 7, taken along the line D—D and looking in the direction of the arrows. Fig. 9 is a modification of the washer seen in Fig. 7 and enlarged for a clearer understanding of the construction.

Similar numerals of reference indicate corresponding parts throughout all the figures of the drawings.

Referring to the drawings, in Fig. 1 is shown my improved connecting rod 10 operatively engaging between a wrist pin 11 and a crank of the crank shaft as at 12, in the well understood manner.

In my invention I provide the outer half of each bearing with hingedly connecting portions for the purposes as further outlined and described. The upper portion of the connecting rod 10 forms a semi-cylindrical bearing 13 within which is seen the pin 11. Similarly the lower portion of the rod 10 provides a semi-cylindrical bearing 14 for the crank 12. Lugs 15 and 16 are cast integral with the side of the connecting rod 10. The outer wrist pin bearing 13ˣ hinged at 17 to a portion integral with the lower bearing element 13 is secured and adjusted in the same manner as the bearing 14ˣ hinged at 18 integral with the upper bearing element 14 which will be described.

A lug 19 integral with the bearing 14 and a lug 20 integral with the hinged bearing 14ˣ are each provided with a hole, said holes as in Fig. 1 stand in alinement and substantially at right angles to the axis of the bearing. The lugs 19 and 20 are provided with flat inner faces spaced apart at 21 to permit of take up as will be readily understood.

The bolt 22 seen in Fig. 4 is provided with a head 23, a threaded inner portion 24 and an outer unthreaded extension 25. The nut seen in Figs. 5 and 6 is provided with a hole 27 to receive the end of a spring as later described; the upper portion of said nut being reduced in size to form a cylindrical collar 28. The washer seen in Figs. 7 and 8 is provided with a plurality of holes 29 within each of which is arranged a ball 30, slightly greater in diameter than the thickness of said washer, the washer serving merely as a retainer for the several balls for the purposes later disclosed.

In the assembly of the elements seen in Fig. 1, one end of a coiled spring 31 is inserted within a hole 32 in the lug 16, the other end of said spring 31 is then inserted in the hole 27 in the nut 26 with the collar 28 arranged within the spring 31. The washer seen in Fig. 7 is then arranged between the upper flat face of the lug 19 and the base of the nut 26, the balls 30 being then a roller spacer therebetween adapted to eliminate friction in the functioning of the elements as later described.

The bolt 22 is then passed through the alined holes in the lugs 19 and 20 and then screwed up on the nut 26 until the slack between the hinged bearing element 14ˣ and the bearing element 14 is taken up. The outer portion 25 of the bolt 22 is rotatably housed within a hole in the lug 16 as illustrated. Holes 33 may be provided in the face of the nut 26 to admit of turning the nut with a punch in lieu of a wrench. The bearing is now adjusted for immediate use but not to compensate for further wear; by turning the nut 26 and the head 23 of the rotatable bolt 22 backwardly both at the same time, the relative position of the parts 14 and 14× is unchanged but tension will be given to the spring 31, then as wear occurs in the bearing, the spring 31 will tend to screw the nut on the bolt and take up play in the bearing. Similar parts in the upper portion of Fig. 1 function in like manner as will be readily understood.

Such modifications may be employed as lie within the scope of the appended claims.

Having fully described my invention what I now claim as new and desire to secure by Letters Patent is:

1. A bearing of the character described comprising a connecting rod carrying hingedly connected elements having their free ends fashioned as lugs provided with alined holes transversely disposed to the axis of the bearing; a bolt passing through said holes having a head at one end, a threaded inner portion and an outer unthreaded extension; a lug integral with the side of said connecting rod, a hole therein and within which said extension of said bolt is rotatably housed, a nut screwably arranged on said threaded bolt and a coiled spring around said bolt having one end secured within said last mentioned lug and the other end secured within said nut, all substantially as specified.

2. A bearing of the character described comprising a connecting rod carrying hingedly connected elements having their free ends fashioned as lugs provided with alined holes transversely disposed to the axis of the bearing; a bolt passing through said holes having a head at one end contacting the outer lug of the combination, a threaded inner portion and an outer unthreaded extension; a lug integral with the side of said connecting rod, a hole therein and within which holes said extension of said bolt is rotatably housed; a nut screwably arranged on said threaded bolt, a roller element as a spacer between said nut and the inner lug of said hinged combination; a coiled spring around said bolt having one end secured within said side lug on the connecting rod and the other end secured within said nut, all substantially as specified.

3. A bearing of the character described comprising a connecting rod carrying hingedly connected elements having their free ends fashioned as lugs provided with alined holes transversely disposed to the axis of the bearing; a bolt passing through said holes having a head at one end contacting the outer lug of the combination, a threaded inner portion and an outer unthreaded extension; a lug integral with the side of said connecting rod, a hole therein and within which hole said extension of said bolt is rotatably housed; a nut screwably arranged on said threaded bolt, a roller element as a spacer between said nut and the inner lug of said hinged combination, a coiled spring around said bolt having one end secured within said side lug of the connecting rod and the other end secured within said nut; backward rotation of said bolt head and nut as a combination operating to develop tension within said spring element which tension operates to revolve said nut for the purposes as specified.

MARTIN PEITZ.

Witnesses:
M. Y. CHARLES,
W. A. NETHERCOT.